United States Patent

Morishima

[11] Patent Number: 6,069,874
[45] Date of Patent: May 30, 2000

[54] RADIO COMMUNICATION APPARATUS WHEREIN ALERT OF MESSAGE OMISSION IS NOT CARRIED OUT ERRONEOUSLY

[75] Inventor: Masaaki Morishima, Shizuoka, Japan

[73] Assignee: NEC Corporation, Tokyo, Japan

[21] Appl. No.: 08/971,259

[22] Filed: Nov. 17, 1997

[30] Foreign Application Priority Data

Nov. 18, 1996 [JP] Japan ................................. 8-306149

[51] Int. Cl.7 ............................................... H04Q 7/06
[52] U.S. Cl. ....................... 370/242; 370/394; 340/825.44
[58] Field of Search .................................... 370/241, 242, 370/389, 394; 340/825.44; 455/31.2, 31.3, 38.1, 38.2, 38.3

[56] References Cited

U.S. PATENT DOCUMENTS

| 5,210,751 | 5/1993 | Onoue et al. | 370/394 |
| 5,315,635 | 5/1994 | Kane et al. | 455/31.2 |
| 5,428,614 | 6/1995 | Shaver | 370/394 |
| 5,463,382 | 10/1995 | Nikas et al. | 340/825.44 |
| 5,596,318 | 1/1997 | Mitchell | 340/825.44 |

FOREIGN PATENT DOCUMENTS 4-240928  8/1992  Japan .
7-107532  4/1995  Japan .

OTHER PUBLICATIONS

Japanese Office Action, dated Dec. 15, 1998, with English language translation of Japanese Examiner's comments.

*Primary Examiner*—Min Jung
*Attorney, Agent, or Firm*—Whitham, Curtis & Whitham

[57] ABSTRACT

In a communication apparatus comprising a receiving section (102, 103, 104) for receiving message data transmitted from a base station as received message data, and a detection section (105) for detecting a transmission number in the received message data to produce a current transmission number, a determining section (106, 107, 108, 109) compares the current transmission number with a previous transmission number to determine whether or not a difference between the current transmission number and the previous transmission number is not less than two and is not more than a predetermined number which is not less than three. When the difference is not less than two and is not more than the predetermined number, an alert section (110) alerts transmission number omission. The predetermined number may be equal to nine when the transmission number is represented by 0 to 31 in decimal. When the current transmission number is equal to the previous transmission number, current received message data is ignored preferably.

7 Claims, 7 Drawing Sheets

| MEMORY NUMBER FIELD | FLAG FIELD | TRANSMISSION NUMBER STORING FIELD | MESSAGE DATA STORING FIELD |
| --- | --- | --- | --- |
| NM X | 0 | 15 | HELLO |
| 16 | 1 | 11 | CALL ME |
| 15 | 0 | 14 | THANK YOU |
| 14 | 0 | 13 | HOW ARE YOU |
| 13 | 1 | 5 | GOOD MORNING |
| 12 | 0 | 12 | CALL OFFICE |
| ..... | ..... | ..... | ..... |
| 2 | 0 | 1 | COME BACK |
| 1 | NO DATA | NO DATA | NO DATA |

FIG. 7

RADIO COMMUNICATION APPARATUS WHEREIN ALERT OF MESSAGE OMISSION IS NOT CARRIED OUT ERRONEOUSLY

BACKGROUND OF THE INVENTION

This invention relates to a radio communication apparatus for receiving a selective call signal which includes message data with a transmission number. The communication apparatus may be a radio paging receiver, a transceiver, or the like although description will mainly directed to the radio paging receiver.

A radio paging system comprises a plurality of radio paging receivers and a plurality of base stations each for transmitting a selective call signal. A radio paging receiver of the type described includes a receiving circuit for carrying out a receiving operation of selectively receiving the selective call signal specific to the apparatus The receiving circuit produces a received signal whenever the receiving circuit receives the selective call signal.

Various radio paging receivers of the type are already known. By way example, a pager is disclosed in U.S. Pat. No. 4,412,217 (which will be herein called reference 1) issued to David P. Willard et al. on Oct. 25, 1983 which is hereby incorporated herein by reference. The pager according to Willard et al. is a pager with visible display indicating status of memory.

The selective call signal may include message data with a transmission number. In this event, the radio paging receiver receives the massage data with the transmission numbers. The transmission number is a number where the system administers transmission order for message data. The transmission numbers are assigned to addresses and the radio paging receiver ascertains whether or not the transmission numbers attached to the massage data are put in order. If the transmission numbers are not put in order such that the transmission numbers skip or the transmission numbers reverse the order, the radio paging receiver generates an alert signal indicative of omission of message. Accordingly, it is possible to notify a user of the radio paging receiver of occurrence of the omission of message.

In the radio paging system of the type described, when the user detects the omission of the message, the user telephones an operator to request retransmission of message. In this event, no problem arises if the message data to be retransmitted is attached with the transmission number which is more than that of the latest message data by one on retransmission of the message having an omitted transmission number.

However, there is a radio paging system where the base station transmits the message data with the same transmission number attached thereto the last time on retransmission. Such a radio paging system is, for example, European Radio Message System (ERMES). Under the circumstances, alert of message omission is carried out on reception of a retransmitted message, although the message omission does not occur actually. This is because the transmission numbers do not continue. Accordingly, such a radio paging system is disadvantageous in that it is difficult for the user to operate and it results in carrying out alert of the message omission erroneously.

In order to resolve the above-mentioned problem, a radio paging receiver is published in Japanese Unexamined Patent Publication of Tokkai No. Hei 6-120,869 or JP-A 6-120,869 (which will be herein called reference 2) on Jun. 28, 1994 which is hereby incorporated herein by reference. The radio paging receiver according to JP-A 6-120,869 comprises a receiver/demodulator, a decoder, a CPU, a massage memory, a buffer, a register, a reception omission alert signal generator, an amplifier, and a speaker. The receiver/demodulator receives and demodulates a selective call signal which is sent from a base station and which includes a call signal and a message signal. The decoder decodes, as decoded signals, the call signal and the message signal from the selective call signal. The decoder decides whether these decoded signals are addressed to its own or not. The CPU stores the message addressed to its own in the message memory and also stores temporarily, as a current transmission number, the transmission number for message in the buffer. A transmission number for message immediately before reception is held in a register as a previous transmission number. The CPU calculates a difference between the current transmission number and the previous transmission number by subtracting the previous transmission number from the current transmission number. When the calculated difference is equal to two or more, a reception omission alert signal is produced by the reception omission alert signal generator. An audible tone indicative of the reception omission of a message is generated by the speaker through the amplifier.

However, in the above-mentioned radio paging system, other message data are assigned with different transmission numbers. In addition, the same transmission number is assigned to the same message data on transmission several times or on retransmission. As a result, the message data for the transmission several times or for the retransmission interrupt in the radio paging receiver during reception of message data having serial transmission numbers. Accordingly, the above-mentioned reference 2 has a problems that the audible tones generate frequently.

SUMMARY OF THE INVENTION

It is therefore an object of this invention to provide a radio paging receiver which does not carry out alert of message omission erroneously.

Other objects of this invention will become clear as the description proceeds.

According to an aspect of this invention, a communication apparatus receives a selective call signal transmitted from a base station. The selective call signal includes message data with a transmission number. The communication apparatus comprises receiving means for receiving the message data transmitted from the base station as received message data. Connected to the receiving means, detection means detects the transmission number in the received message data to produce a current transmission number. Connected to the detection means, storing means stores, as a previous transmission number, the current transmission number of the latest received message data alerted. Connected to the detection means and the storing means, determining means compares the current transmission number with the previous transmission number to determine whether or not a difference between the current transmission number and the previous transmission number is not less than two and is not more than a predetermined number which is not less than three. Connected to the determining means, alert means alerts transmission number omission when the difference is not less than two and is not more than the predetermined number.

A method to which this invention is applicable is of alerting transmission number omission in a communication apparatus for receiving a selective call signal transmitted from a base station. The selective call signal includes message data with a transmission number. According to an aspect of this invention, the method comprises the steps of: receiving the message data transmitted from the base station as received message data; detecting the transmission number in the received message data to produce a current transmission number; storing, as a previous transmission numbers the current transmission number of the latest received message data alerted; comparing the current transmission number with the previous transmission number to determine whether or not a difference between the current transmission number and the previous transmission number is not less than two and is not more than a predetermined number which is not less than three; and alerting the transmission number omission when the difference is not less than two and is not more than the predetermined number.

A method to which this invention is applicable is of controlling reception operation in a communication apparatus for receiving a selective call signal transmitted from a base station. The selective call signal includes message data with a transmission number According to another aspect of this invention, the method comprises the steps of: receiving the message data transmitted from the base station as received message data; detecting the transmission number in the received message data to produce a-current transmission number; storing, as a previous transmission number, the current transmission number of the latest received message data alerted; comparing the current transmission number with the previous transmission number to determine whether or not the current transmission number is equal to the previous transmission number; and ignoring current received message data when the current transmission number is equal to the previous transmission number.

BRIEF DESCRIPTION OF THE DRAWING

FIG. 7 is an example of the memory map illustrated in FIG. 5.

DESCRIPTION OF THE PREFERRED EMBODIMENT

Figure 1:
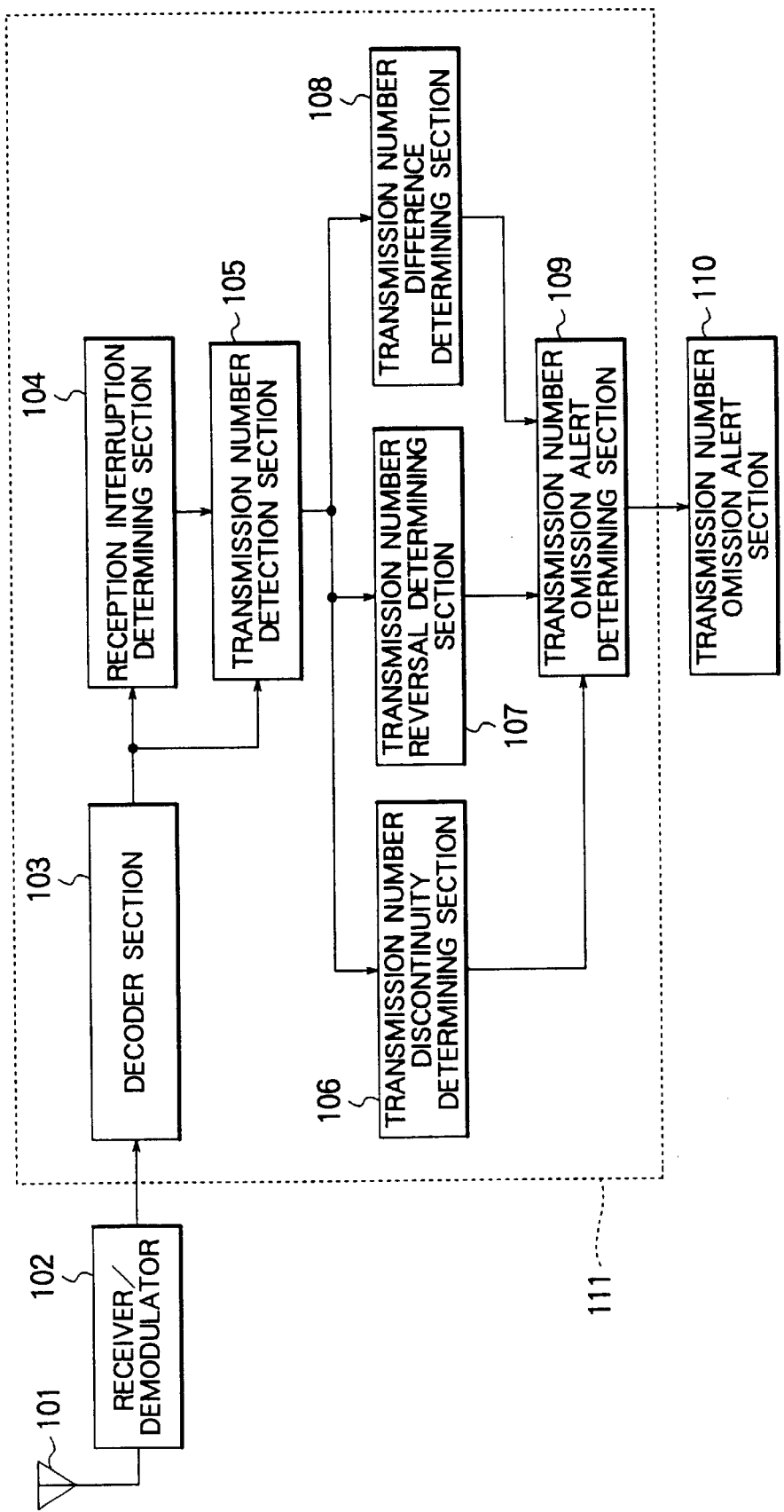
FIG. 1 is a block diagram of a radio paging receiver according to a first embodiment of this invention.

Referring to FIG. 1, the description will proceed to a radio paging receiver according to a first embodiment of this invention. The illustrated radio paging receiver comprises an antenna 101, a receiver/demodulator 102, a decoder section 103, a reception interruption determining section 104, a transmission number detection section 105, a transmission number discontinuity determining section 106, a transmission number reversal determining section 107, a transmission number difference determining section 108, a transmission number omission alert determining section 109, and a transmission number omission alert section 110.

A base station (not shown) in a radio paging system transmits a selective call signal which includes a call signal indicative a call number and a massage signal with a system transmission number. The selective call signal is received through the antenna 101 by the receiver/demodulator 102. The receiver/demodulator 102 receives and demodulates the selective call signal to produce a demodulated selective call signal. The demodulated selective call signal is supplied to the decoder section 103. The decoder section 103 decodes the demodulated selective call signal into a decoded selective call signal. The decoded call signal is supplied to the reception interruption determining section 104. The reception interruption determining section 104 is given with a directory number specific to the radio paging receiver in question. The reception interruption determining section 104 determines whether or not the call number included in the decoded call signal coincides with the directory number. When the call number in the decoded call signal coincides with the directory number, the reception interruption determining section 104 produces a reception interruption signal which is supplied to the transmission number detection section 105.

When the transmission number detection section 105 is activated by the reception interruption signal from the reception interruption determining section 104, the transmission number detection section 105 detects the system transmission number included in the decoded call signal to produce a detected transmission number. The detected transmission number is supplied, as a current transmission number, to the transmission number discontinuity determining section 106, the transmission number reversal determining section 107, and the transmission number difference determining section 108.

Each of the transmission number discontinuity determining section 106, the transmission number reversal determining section 107, and the transmission number difference determining section 108 stores, as a previous transmission number, a transmission number included in the latest message signal which is already received and alerted in the radio paging receiver.

The transmission number discontinuity determining section 106 determines whether or not the current transmission number continuously follows the previous transmission number. When the current transmission number does not continuously follow the previous transmission number, the transmission number discontinuity determining section 106 produces a discontinuity detection signal which is supplied to the transmission number omission alert determining section 109.

The transmission number reversal determining section 107 determines whether or not the current transmission number follows the previous transmission number in reverse order. When the current transmission number follows the previous transmission number in reverse order, the transmission number reversal determining section 107 produces a reversal detection signal which is supplied to the transmission number omission alert determining section 109.

The transmission number difference determining section 108 is given with a predetermined number which is not less than threes The transmission number difference determining section 108 calculates a difference between the current transmission number and the previous transmission number to obtain a difference number indicative of the difference. Subsequently, the transmission number difference determining section 105 determines whether or not the difference number is more than the predetermined number. When the difference number is more than the predetermined number, the transmission number difference determining section 108 produces an unfavorable difference detection signal which is supplied to the transmission number omission alert determining section 109.

The transmission number omission alert determining section 109 is supplied with the discontinuity detection signal, the reversal detection signal, and the unfavorable difference detection signal from the transmission number discontinuity determining section 106, the transmission number reversal determining section 107, and the transmission number difference determining section 108, respectively, in the manner which is described above. The transmission number omission alert determining section 109 determines, on the basis of the discontinuity detection signal, the reversal detection signal, and the unfavorable difference detection signal, whether to alert transmission number omission or not. When the discontinuity detection signal is present and when both of the reversal detection signal and the unfavorable difference detection signal are absent, the transmission number omission alert determining section 109 sends a transmission number omission alert signal to the transmission number omission alert section 110 to make the transmission number omission alert section 110 alert transmission number omission.

In other words, the transmission number omission alert determining section 109 produces a transmission number omission alert signal when the difference between the current transmission number and the previous transmission number is not less than two and is not more than the predetermined number. Accordingly, a combination of the transmission number discontinuity determining section 106, the transmission number reversal determining section 107, the transmission number difference determining section 108, and the transmission number omission alert determining section 109 serves as a determining arrangement for determining whether or not the difference between the current transmission number and the previous transmission number is not less than two and is not more than the predetermined number.

In the above-mentioned first embodiment, the decoder section 103, the reception interruption determining section 104, the transmission number detection section 105, the transmission number discontinuity determining section 106, the transmission number reversal determining section 107, the transmission number difference determining section 108, and the transmission number omission alert determining section 109 may be constructed as hardware and/or software or may be integrated into one or more control large-scale integrated circuits (LSIs) 111.

Figure 2:
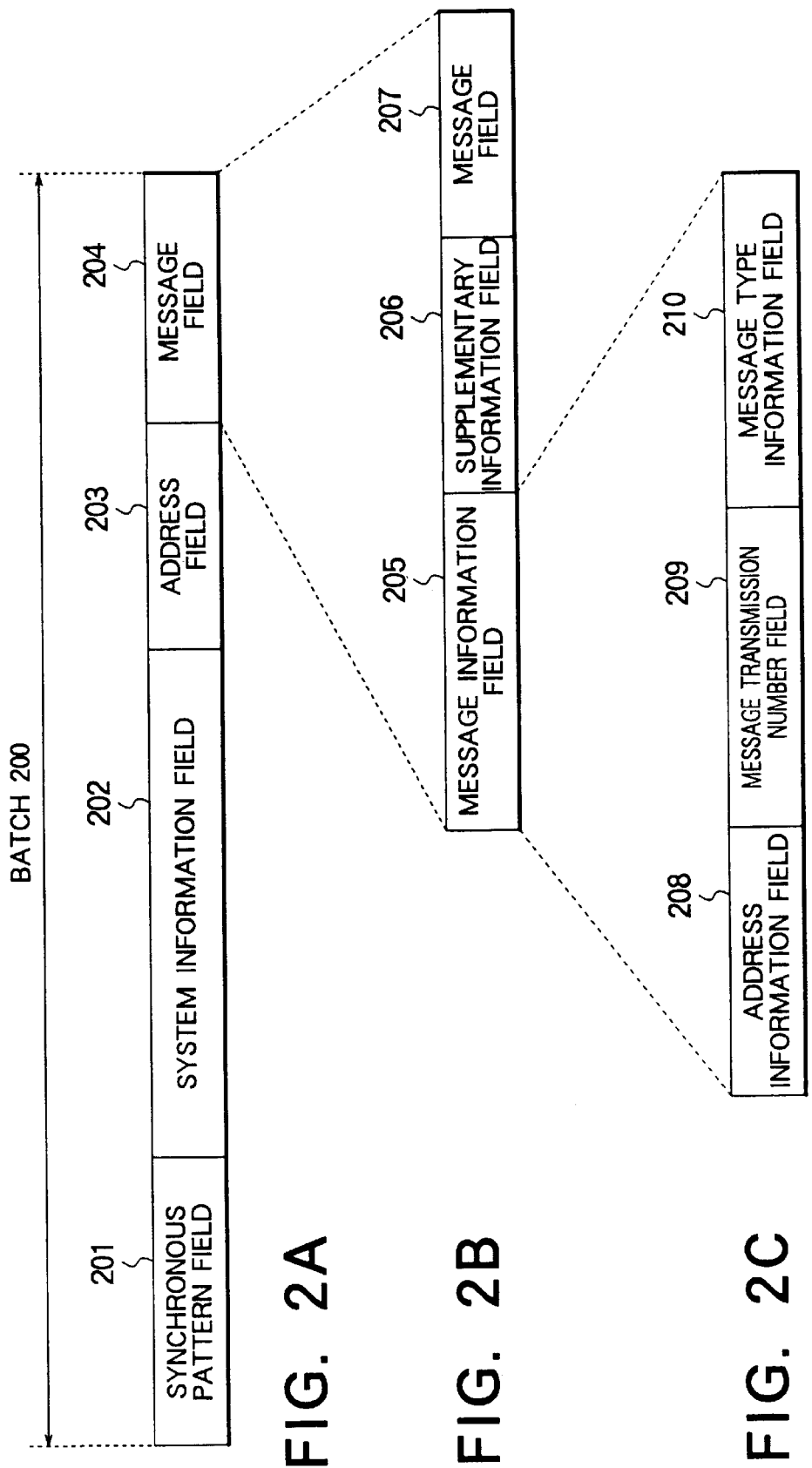
FIGS. 2A through 2C collectively show a format of a selective call signal for use in the radio paging receiver.

Turning to FIGS. 2A, 2B, and 2C, the description will proceed to the selective call signal or a paging signal for use in the radio paging system. As shown in FIG. 2A, the selective call signal consists of a batch 200. The batch 200 comprises a synchronous pattern field 201 including information for synchronizing to a signal sent from the base station, a system information field 202 including information for base station system, an address field 203 including the call number or address, and a message field 204 including message information.

As shown in FIG. 2B, the message field 204 comprises a message information field 205 including information added to a message, a supplementary information field 206 including supplementary information excepting the message to be displayed, and a message field 207 including reception message information. The supplementary information is used, for example, in case of controlling the radio paging receiver by the base station.

As shown in FIG. 2C, the message information field 205 comprises an address information field 208 including address information for determining whether to call or not, a message transmission number field 209 including the transmission number, and a message type information field 210 including message type information indicative of a type of the message. The type of the message classifies, for instance, a numerical message, an alphanumeric message, or the like.

The above-mentioned paging signal also is used in European Radio Message System (ERMES). In ERMES, the transmission number is five bits in length. That is, the transmission number is represented by "00000" to "11111" in binary or by 0 to 31 in decimal.

Figure 3:
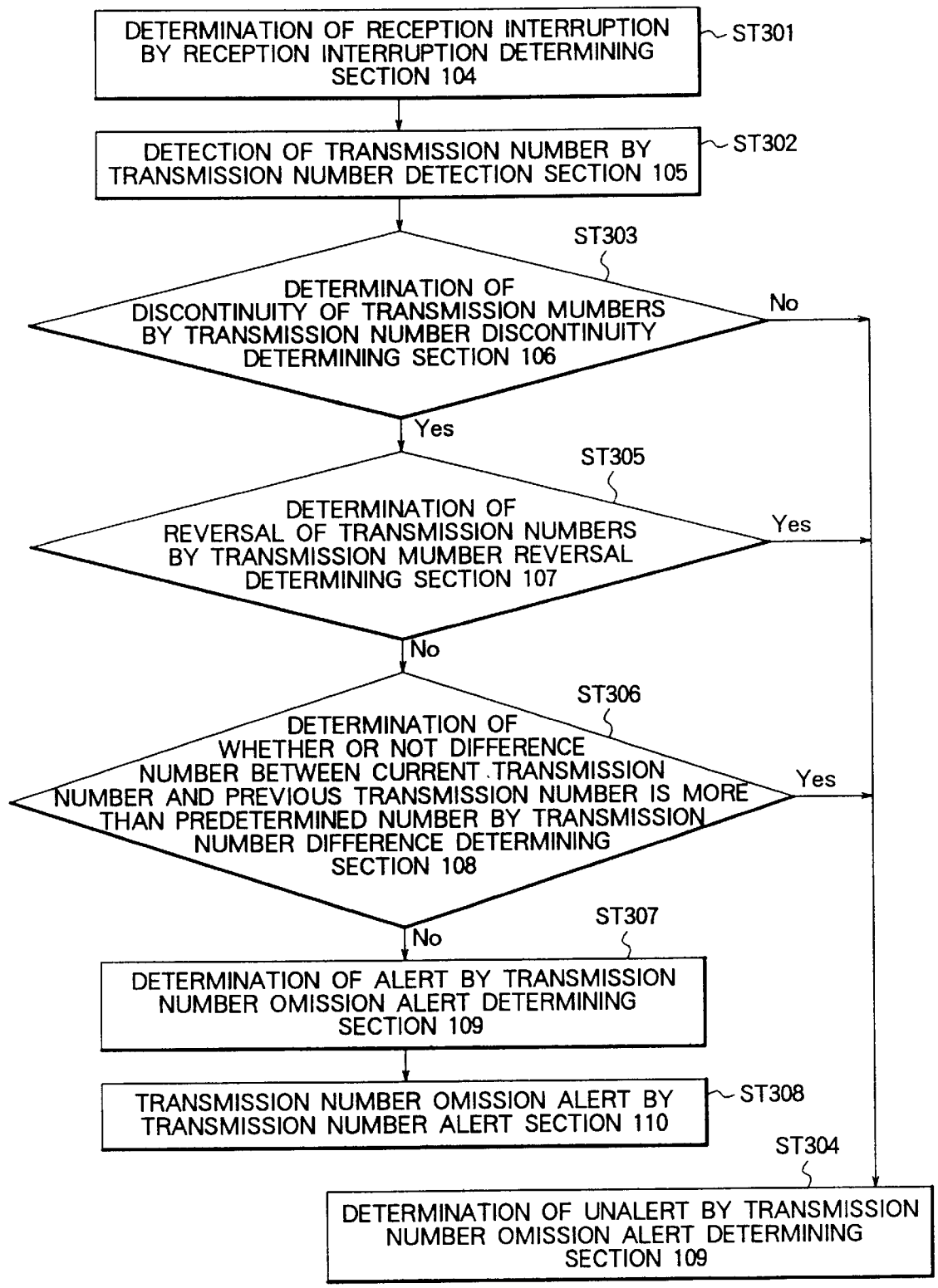
FIG. 3 is a flow chart for use in describing operation of the radio paging receiver illustrated in FIG. 1.

Referring to FIG. 3, description will proceed to operation of the radio paging receiver illustrated in FIG. 1. At a step ST301, the reception interruption determining section 104 carries out determination of the reception interruption. When the reception interruption is detected or when the call number in the decoded call signal coincides with the directory number, the step ST301 is followed by a step ST302 at which the transmission number detection section 105 carries out detection of the transmission number included in the reception message data. After the detection of the transmission number is carried out by the transmission number detection section 105, the step ST302 proceeds to a step ST303 at which the transmission number discontinuity determining section 106 compares the current transmission number with the previous transmission number to determine the discontinuity of there transmission numbers. When the transmission number discontinuity determining section 106 detects continuity of these transmission numbers (No in the step ST303), the step ST303 is succeeded by a step ST304 at which the transmission number omission alert determining section 109 determines unalert.

When the transmission number discontinuity determining section 106 detects discontinuity of these transmission numbers (Yes in the step ST303), the step ST303 is followed by a step ST305 at which the transmission number reversal determining section 107 compares the current transmission number with the previous transmission number to determine reversal of there transmission numbers. When the transmission number reversal determining section 107 detects reversal of there transmission numbers (Yes in the step ST305), the step ST305 proceeds to the step ST304 at which the transmission number omission alert determining section 109 determines unalert. When the transmission number reversal determining section 107 detects nonreversal of there transmission numbers (No in the step ST305), the step ST305 is succeeded by a step ST306 at which the transmission number difference determining section 108 compares the current transmission number with the previous transmission number to determine whether or not the difference number between the current transmission number and the previous transmission number is more than the predetermined number.

When the transmission number difference determining section 108 determines that the difference number is more than the predetermined number (Yes in the step ST306), the step ST306 is followed by the step ST304 at which the transmission number omission alert determining section 109 determines unalert. When the transmission number difference determining section 108 determines that the difference number is not more than the predetermined number (No in the step ST306), the step ST306 proceeds to a step ST307 at which the transmission number omission alert determining section 109 determines alert. The step ST307 is succeeded by a step ST308 at which the transmission number omission alert section 110 carries out transmission number omission alert.

Figure 4:
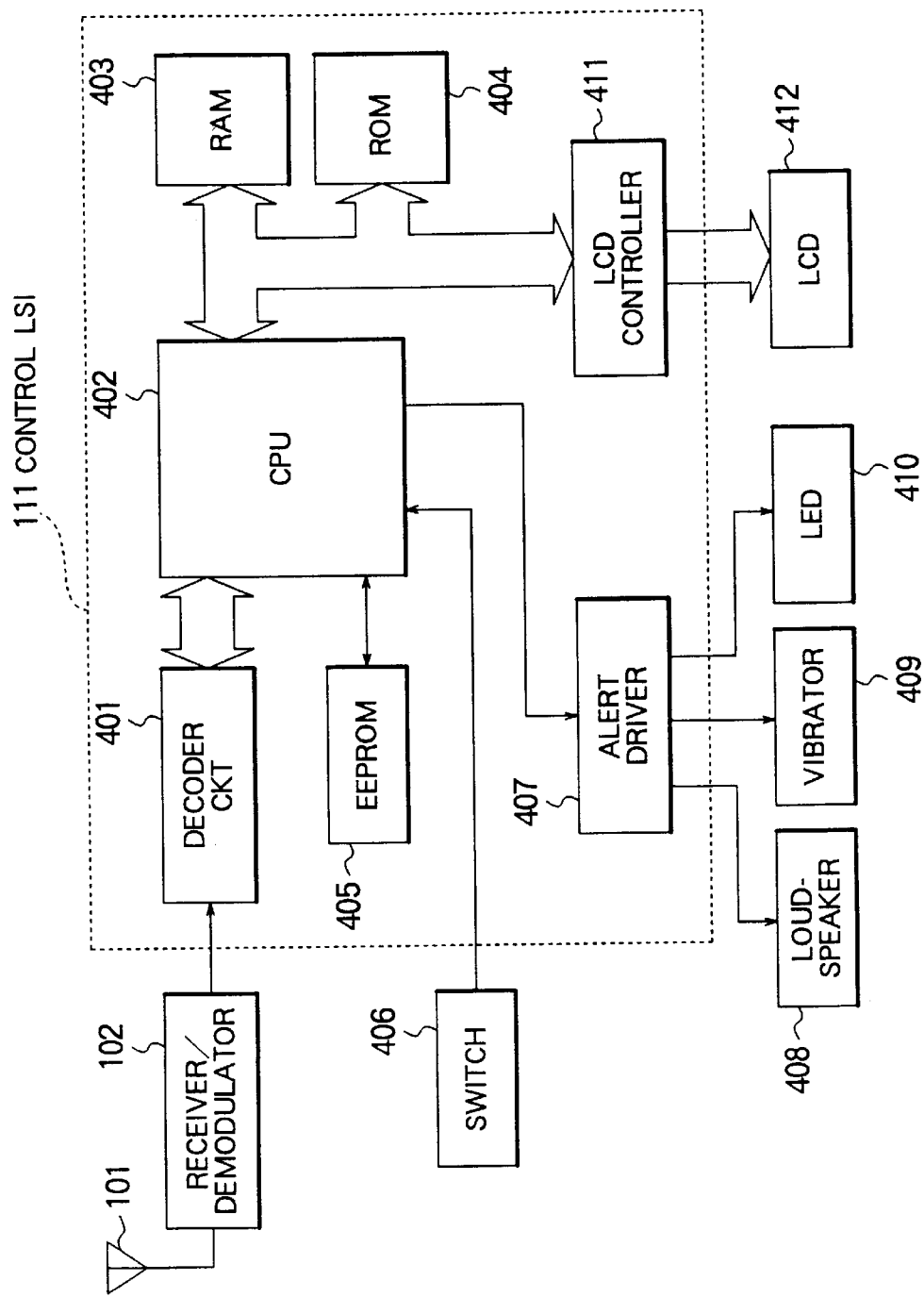
FIG. 4 is a block diagram of a radio paging receiver according to a second embodiment of this invention.

Referring to FIG. 4, the description will proceed to a radio paging receiver according to a second embodiment of this invention. The control LSI 111 comprises a decoder circuit 401, a central processing unit (CPU) 402, a random access memory (RAM) 403, a read-only memory (ROM) 404, and an electrically erasable programmable read-only memory (EEPROM) 405. The decoder circuit 401 corresponds to the decoder section 101 illustrated in FIG. 1. The CPU 402 may be an 8-bit CPU of Z80-type. The CPU 402 is connected to the decoder circuit 401, the RAM 403, the ROM 404, and the EEPROM 405. The radio paging receiver is provided with a switch 406 connected to the CPU 402. The control LSI 111 further comprises an alert driver 407 for driving a loudspeaker 408, a vibrator 409, and a light emitting diode (LED) 410 and a liquid crystal display (LCD) controller 411 for controlling an LCD 412. A combination of the loudspeaker 408, the vibrator 409, and the LED 410 serves as the transmission number omission alert section 110 illustrated in FIG. 1. The alert driver 407 is connected to the CPU 402. The LCD controller 411 is connected to the CPU 402, the RAM 403, and the ROM 404 via a bus.

The selective call signal is transmitted as a radio signal from the base station (not show). The radio signal is picked up by the antenna 101 and supplied to the receiver/demodulator 102. The receiver/demodulator 102 receives and demodulates the radio signal into a baseband or demodulated signal. The demodulated signal is supplied to the decoder circuit 401. The decoder circuit 401 decodes the demodulated signal into a decoded signal which is supplied to the CPU 402. The EEPROM 405 preliminarily stores the directory number specific to the radio paging receiver. The CPU 402 compares the call number included in the decoded signal with the directory number. In other words, the CPU 402 determines whether or not the directory number is included in the decoded signal by pattern matching.

After the CPU 402 detects the directory number or the reception interruption occurs, the CPU 402 stores reception message in the decoded signal in the RAM 403 and makes the loudspeaker 408, the vibrator 409, and the LED 410 operate via the alert driver 407. In addition, the CPU 402 makes the LCD 412 display the reception message via the LCD controller 411. The switch 406 is used not only for making an audible tone during reception stop but also for reading the reception message out of the RAM 403 to the LCD 412. In addition, the ROM 404 stores a program for operating the CPU 402.

The role of the reception interruption determining section 104, the transmission number detection section 105, the transmission number discontinuity determining section 106, the transmission number reversal determining section 107, the transmission number difference determining section 108, and the transmission number omission alert determining section 109 illustrated in FIG. 1 is implemented by control of the CPU 402 in accordance with software programmed in the ROM 404.

Figure 5:
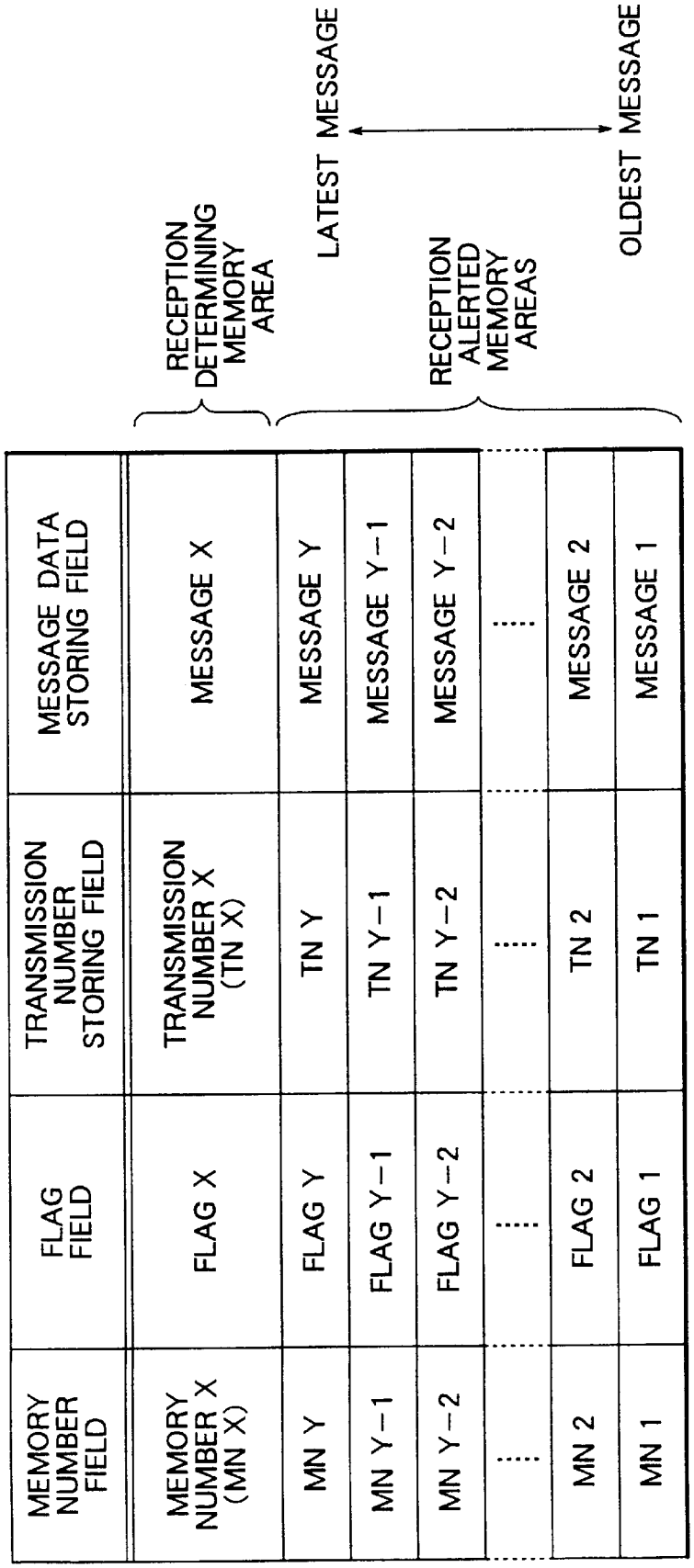
FIG. 5 shows a memory map assigned to an RAM for use in the radio paging receiver illustrated in FIG. 4.

FIG. 5 shows a memory map assigned to the RAM 403 illustrated in FIG. 4. Information related to the reception message data is stores in the RAM 403. More specifically, the RAM 403 is divided into a reception determining memory area X and a plurality of reception alerted memory areas Y, Y-1, Y-2, . . . , 2, and 1. The reception determining memory area X stores the message on reception as a current reception message. The reception alerted memory areas Y to 1 store reception alerted messages which comprise the latest message to the oldest message determined by a memory capacity. The reception alerted memory area Y is called a latest reception alerted memory area while the reception alerted memory area 1 is called an oldest reception alerted memory area.

When the current reception message is alerted, the current reception message is shifted from the reception determining memory area X to the latest reception alerted memory area Y. In this event, in the reception alerted memory areas Y to 1, the current reception message is stored as the latest message in the reception alerted memory area Y and the reception alerted messages are shifted to the oldest message direction in order. When a capacity of the reception alerted messages exceeds the memory capacity of the RAM 403, the reception alerted messages are successively erased from the RAM 403 in the oldest message order.

As shown in FIG. 5, each of the reception determining memory area X and the reception alerted memory area Y to 1 is divided into four area, namely, a memory number field, a flag field, a transmission number storing field, and a message data storing field.

Each memory number field is for storing a memory number for each memory area. The memory number field of the reception determining memory area X is assigned with the memory number MN X while the memory number fields of the reception alerted memory areas Y to 1 are assigned with the memory numbers MN Y, MN Y-1, MN Y-2, . . . , MN 2, and MN 1, as shown in FIG. 5. Each flag field is for storing, as a determined result flag, the transmission number omission alert signal produced by the transmission number omission alert determining section 109. The flag field of the reception determining memory area X is assigned with, as the determined result flag, Flag X while the flag fields of the reception alerted memory area Y to 1 are assigned with, as the determined result flags, Flag Y, Flag Y-1, Flag Y-2, . . . , Flag 2, and Flag 1, as shown in FIG. 5.

Each transmission number storing field is for storing the transmission number included in the message transmission number field 209 in FIG. 2C. The transmission number storing field of the reception determining memory area X is assigned with the transmission number TN X while the transmission number storing fields of the reception alerted memory areas Y to 1 are assigned with the transmission numbers TN Y, TN Y-1, TN Y-2, . . . , TN 2, and TN 1, as shown in FIG. 5. The transmission number TN X is the current transmission number while the transmission number TN Y is the previous transmission number. Each message data storing field is for storing message data included in the message field 207 in FIG. 2B. The message data storing field of the reception determining memory area X is assigned with, as the message data, Message X while the message data storing fields of the reception alerted memory areas Y to 1 are assigned with, as the message data, Message Y, Message Y-1, Message Y-2, . . . , Message 2, and Message 1, as shown in FIG. 5.

Figure 6:
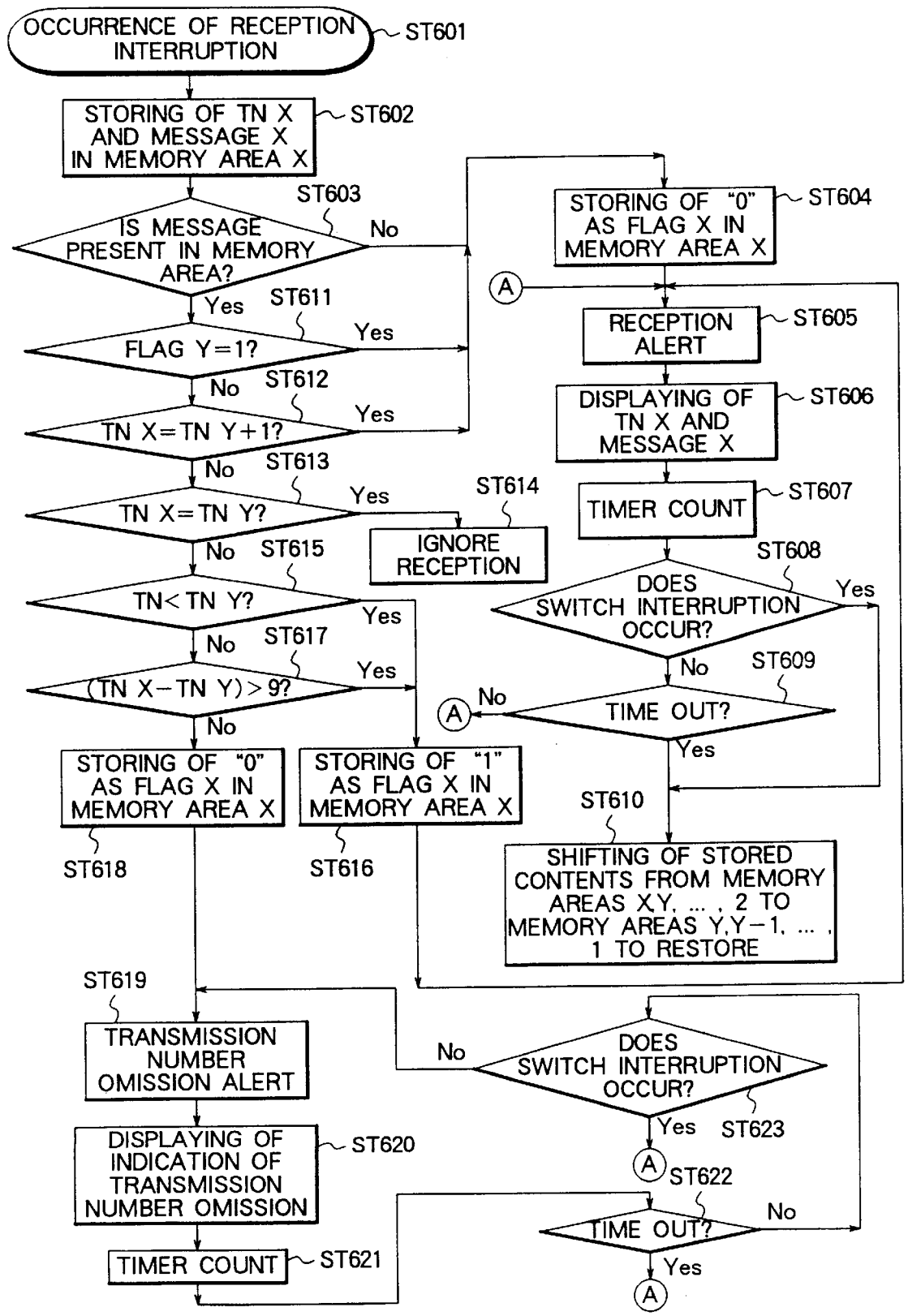
FIG. 6 is a flow chart for use in describing operation of the radio paging receiver illustrated in FIG. 4.

Referring to FIG. 6, description will proceed to operation of the radio paging receiver illustrated in FIG. 4. At a step ST601, the reception interruption occurs in the CPU 402. After the reception interruption occurs, the step ST601 is followed by a step ST602 at which the CPU 402 stores, as the TN X and the Message X, the transmission number and the reception message on reception in the transmission number storing area and the message data storing area of the reception determining memory area X, respectively. The step ST 602 proceeds to a step ST603 at which the CPU 402 determines whether or not any reception alerted message is stored in the reception alerted memory area Y. If no reception alerted message is stored in the reception alerted memory area Y (No in the step ST603), the step ST 603 is succeeded by a step ST604 at which the CPU 403 stores, as the Flag X, a logic "0" in the flag area of the reception determining memory area X. "Flag X=0" indicates that reversal of the transmission numbers does not occur between the latest message and the message on reception.

The step ST604 is followed by a step ST605 at which the CPU 402 carries out reception alert operation (activates the loudspeaker 408, the vibrator 409, and the LED 410 via the alert driver 407). The step ST605 proceeds to a step ST606 at which the CPU 402 displays the transmission number (TN X) and the reception message (Message X) on the LCD via the LCD controller 411. The step ST606 is succeeded by a step ST607 at which the CPU 402 starts a first timer count for the reception alert operation and for A display operation of the transmission number (TN X)/the reception message (Message X). When a switch interruption does not occur (go in a step ST608) and when a time out dose not occur in the first timer count (No in a step ST609), the CPU 402 turns back to the step ST605 and the reception alert operation and the display operation are continued.

When the switch interruption is present (Yes in the step ST608) or when the tine out occurs in the first timer count (Yes in the step ST609), each of the steps ST608 and ST609 is followed by a step ST610 at which the CPU 402 stops the reception alert operation, shifts stored contents from the memory areas X, Y, . . . , and 2 to the memory areas Y, Y-1, . . . , and 1 to restore the stored contents, and erases the transmission number (TN X)/the reception message (Message X) from the reception determining memory area X.

When the reception alerted message is stored in the reception alerted memory area Y (Yes in the step ST603), the step ST 603 proceeds to a step ST611 at which the CPU 402 determines whether or not the Flag Y is equal to a logic "1". "Flag Y=1" indicates that reversal of the transmission numbers occurs between the latest message and the message older than the latest message by one. When the reversal of the transmission numbers is present or "Flag Y=1" (Yes in the step ST611), the step ST611 is succeeded by the step ST604.

When the reversal of the transmission numbers does not occur or "Flag Y=0" (No in the step ST611), the step ST611 is followed by a step ST612 at which the CPU 402 compares the current transmission number TN X with the previous transmission number TN Y to determine continuity of there transmission number TN X and TN Y or (TN X=TN Y+1). When the transmission number TN X and TN Y are continuous or (TN X=TN Y+1) (Yes in the step ST612), the step ST proceeds to the step ST604.

When the transmission number TN X and TN Y are not continuous or (TN X≠TN Y+1) (so in the step ST612), the step ST612 is succeeded by a step ST613 at which the CPU 402 compares the current transmission number TN X with the previous transmission number TN Y to determine whether or not the current transmission number TN X is equal to the previous transmission number TN Y or (TN X=TN Y). As mentioned in the preamble of the instant specification, there is the radio paging system where a base station transmits the same transmission number and the same message (the same call signal) a plurality of times in a predetermined time interval. The step ST613 carries out determination of the same call signal so at to not store the same call signal two or more times in the latest reception alerted memory area Y. When the current transmission number TN X is equal to the previous transmission number TN Y or (TN X=TN Y) (Yes in the step ST613), the step ST613 is followed by a step ST614 at which the CPU 402 ignores reception.

When the current transmission number TN X is not equal to the previous transmission number TN Y or (TN X≠TN Y) (No in the step ST613), the step ST613 proceeds to a step ST615 at which the CPU 402 compares the current transmission number TN X with the previous transmission number TN Y to determine reversal of there transmission numbers TN X and TN Y. Specifically, at the step ST615, the CPU 402 determines whether or not the previous transmission number TN Y of the latest message is greater than the current transmission number TN X of the current message on reception or (TN X<TN Y). When the previous transmission number TN Y is greater than the current transmission number TN X or (TN X<TN Y) (Yes in the step ST615), the step ST615 is succeeded by a step ST616 at which the CPU 402 stores, as the Flag X, the logic "1" indicative of the reversal of there transmission numbers in the flag area of the reception determining memory area X. The step ST616 is followed by the step ST605.

When the current transmission number TN X is greater than the previous transmission number TN Y or (TN X>TN Y) (No in the step ST615), the step ST615 proceeds to a step ST617 at which the CPU 402 compares the current transmission number TN X with the previous transmission number TN Y to determine whether or not the difference number (TN X-TN Y) between the current transmission number TN X and the previous transmission number TN Y is more than the predetermined number. In the example being illustrated, the predetermined number is equal to nine.

When the difference number (TN X-TN Y) is more than the predetermined number or (TN X-TN Y>9) (Yes in the step ST617), the step ST617 is followed by the step ST616. That is, in this embodiment, a larger difference number is considered no occurrence of message omission. On the other hand, when the difference number (TN X-TN Y) is not more than the predetermined number or (TN X-TN Y≦9) (No in the step ST617), the step ST617 proceeds to a step ST618 at which the CPU 402 stores, as the Flag X, the logic "0" in the flag area of the reception determining memory area X. The step ST618 is followed by the step ST619 at which the CPU 402 carries out transmission number omission alert (activates the loudspeaker 408, the vibrator 409, or the LED 410 via the alert driver 407) in order to alert occurrence of transmission number omission. The step ST619 is succeeded by a step ST620 at which the CPU 402 displays an indication of the transmission number omission on the LCD 412 via the LCD controller 411.

The step ST620 is succeeded by a step ST621 at which the CPU 402 starts a second timer count for the transmission number omission alert operation and for a display operation of the transmission number omission. When a time out dose not occur in the second timer count (No in a step ST622) and when a switch interruption is absent (No in a step ST623), the CPU 402 turns back to the step ST619 and the transmission number omission alert operation and the display operation of the transmission number omission are continued.

When the time out occurs in the second timer count (Yes in the step ST622) or when the switch interruption is present (Yes in the step ST623), the CPU 402 stops the transmission number omission alert operation, erases the indication of the transmission number omission, and thereafter each of the steps ST622 and ST623 is followed by the step ST605.

FIG. 7 shows an example of the memory map assigned to the RAM 403 illustrated in FIG. 4. The reception determining memory area X stores the current transmission number of "15" and the current message data of "Hello" in the transmission number storing field and the message data storing field thereof as shown in FIG. 7. After the reception alert comes to end, the stored contents of the reception determining memory area X is shifted to the latest reception alerted memory area Y.

Inasmuch as no data are stored in the oldest reception alerted memory area 1 having the memory number NM 1 of "1", the logic "0" is unconditionally assigned as the Flag 2 for the next reception alerted message data of "Come back" in the flag field of the next older reception alerted memory area 2. Inasmuch as the reversal of the transmission numbers occurs in the reception alerted memory areas 12 and 13 having the memory numbers MN 12 and MN 13 of "12" and "13" so as to shift from the transmission number TN 12 of "12" from the transmission number TN 13 of "5", the logic "1" is assigned as the Flag 13 for the reception alerted message data of "Good Morning".

Inasmuch as the Flag 13 of the reception alerted memory area 13 having the memory number MN 13 of "13" is equal to the logic "1" or (Flag 13="1"), the logic "0" is unconditionally assigned as the Flag 14 for the next reception alerted message data of "Thank you" in the flag field of the reception alerted memory area 14. Likewise, inasmuch as the Flag 16 of the latest reception alerted memory area Y having the memory number MN Y of "16" is equal to the logic "1" or (Flag Y or Flag 16="1"), the logic "0" is unconditionally assigned as the Flag X for the current reception message data of "Hello" in the flag field of the reception determining memory area X.

While this invention has thus far been described in conjunction with a few preferred embodiments thereof, it will now be readily possible for those skilled in the art to put this invention into various other manners. For example, the predetermined number stay be not less than three although the predetermined number is equal to nine in the above-mentioned second embodiment.

What is claimed is:

1. A communication apparatus for receiving a selective call signal transmitted from a base station, said selective call signal including message data with a transmission number, said communication apparatus comprising:

receiving means for receiving the message data transmitted from said base station as received message data;

detection means connected to said receiving means, for detecting the transmission number in the received message data to produce a current transmission number;

storing means, connected to said detection means, for storing, as a previous transmission number, the current transmission number of the latest received message data alerted;

determining means, connected to said detection means and Bald storing means, for comparing the current transmission number with the previous transmission number to determine whether or not a difference between the current transmission number and the previous transmission aver is not less than two and is not more than a predetermined number which is not less than three; and alert means, connected to said determining means, for alerting transmission number omission when the difference is not less than two and is not more than the predetermined number.

2. A communication apparatus as claimed in claim 1, wherein said determining means comprising:

transmission number discontinuity determining means for determining whether or not the current transmission number continuously follows the previous transmission number, said transmission number discontinuity determining means producing a discontinuity detection signal when the current transmission number does not continuously follow the previous transmission number;

transmission number reversal determining means for determining whether or not the current transmission number follows the previous transmission number in reverse order, said transmission number reversal determining means producing a reversal detection signal when the current transmission number follows the previous transmission number in reverse order;

transmission number difference determining means for determining whether of not the difference is more than the predetermined number, said transmission number difference determining means producing an unfavorable difference detection signal; and transmission number omission alert determining means, connected to said transmission number discontinuity determining means, said transmission number reversal determining means, and said transmission number difference determining means, for determining, on the basis of the discontinuity detection signal, the reversal detection signal, and the unfavorable difference detection signal, whether to alert the transmission number omission or not, said transmission number omission alert determining means sending a transmission number omission alert signal to said alert means to make said alert means alert the transmission number omission when the discontinuity detection signal is present and when both of the reversal detection signal and the unfavorable difference detection signal are absent.

3. A communication apparatus as claimed in claim 1, wherein the transmission number is represented by 0 to 31 in decimal, the predetermined number being equal to nine.

4. A method of alerting transmission number omission in a communication apparatus for receiving a selective call signal transmitted from a base station, said selective call signal including message data with a transmission number, said method comprising the steps of:

receiving the message data transmitted from said base station as received message data;

detecting the transmission number in the received message data to produce a current transmission number;

storing, as a previous transmission number, the current transmission number of the latest received message data alerted;

comparing the current transmission number with the previous transmission number to determine whether or not a difference between the current transmission number and the previous transmission number is not less than two and is not more than a predetermined number which is not less than three; and alerting the transmission number omission when the difference is not less than two and is not more than the predetermined number.

5. A method as claimed in claim 4, wherein said comparing step comprising the substeps:

comparing the current transmission number and the previous transmission number to determine discontinuity of there transmission numbers;

comparing, on detection of the discontinuity of there transmission numbers, the current transmission number and the previous transmission number to determine reversal of there transmission numbers;

comparing, on detection of nonreversal of there transmission numbers, the current transmission number and the previous transmission number to determine the difference is more than the predetermined number; and determining alert of the transmission number omission when the difference is not more than the predetermined number.

6. A method as claimed in claim 4, wherein the transmission number is represented by 0 to 31 in decimal, the predetermined number being equal to nine.

7. A method of controlling reception operation in a communication apparatus for receiving a selective call signal transmitted from a base station, said selective call signal including message data with a transmission number, said method comprising the steps of:

receiving the message data transmitted from said base station as received message data;

detecting the transmission number in the received message data to produce a current transmission number;

storing, as a previous transmission number, the current transmission number of the latest received message data alerted;

comparing the current transmission number with the previous transmission number to determine whether or not the current transmission number is equal to the previous transmission number; and ignoring current received message data when the current transmission number is equal to the previous transmission number.

* * * * *